(12) United States Patent
Flanders et al.

(10) Patent No.: US 9,046,337 B2
(45) Date of Patent: Jun. 2, 2015

(54) INTEGRATED OCT DETECTOR SYSTEM WITH TRANSIMPEDANCE AMPLIFIER

(75) Inventors: Dale C. Flanders, Lexington, MA (US); Randal A. Murdza, North Andover, MA (US)

(73) Assignee: VOLCANO CORPORATION, San Diego, CA (US)

( * ) Notice: Subject to any disclaimer, the term of this patent is extended or adjusted under 35 U.S.C. 154(b) by 758 days.

(21) Appl. No.: 12/981,770

(22) Filed: Dec. 30, 2010

(65) Prior Publication Data
US 2012/0168650 A1 Jul. 5, 2012

(51) Int. Cl.
*G01B 9/10* (2006.01)
*G01B 9/02* (2006.01)

(52) U.S. Cl.
CPC .......... *G01B 9/0203* (2013.01); *G01B 9/02004* (2013.01); *G01B 9/02051* (2013.01); *G01B 9/02091* (2013.01); *G01B 9/02069* (2013.01); *G01B 2290/70* (2013.01)

(58) Field of Classification Search
CPC ............ G01B 9/02004; G01B 9/0203; G01B 9/02051; G01B 9/02069; G01B 9/02091
USPC .............. 250/214.1, 227.27, 550; 372/20, 27; 385/14; 356/497; 398/212
See application file for complete search history.

(56) References Cited

U.S. PATENT DOCUMENTS

| | | | |
|---|---|---|---|
| 5,037,202 A | 8/1991 | Batchelder et al. | |
| 5,206,924 A | 4/1993 | Kersey | |
| 5,317,382 A * | 5/1994 | Miyazaki et al. | 356/491 |
| 5,903,393 A * | 5/1999 | Kalibjian | 359/618 |
| 6,053,613 A | 4/2000 | Wei et al. | |
| 6,307,634 B2 | 10/2001 | Hitzenberger et al. | |

(Continued)

FOREIGN PATENT DOCUMENTS

| WO | 2005/077257 A1 | 8/2005 |
|---|---|---|
| WO | 2010021669 A2 | 2/2010 |

(Continued)

OTHER PUBLICATIONS

International Search Report dated Jul. 12, 2012, from International Patent Application PCT/US2011/065397, filed on Dec. 16, 2011.

(Continued)

*Primary Examiner* — Kevin Pyo
*Assistant Examiner* — Kevin Wyatt
(74) *Attorney, Agent, or Firm* — Brown Rudnick LLP; Thomas C. Meyers

(57) ABSTRACT

An optical detector system comprises a hermetic optoelectronic package, an optical bench installed within the optoelectronic package, a balanced detector system installed on the optical bench. The balanced detector system includes at least two optical detectors that receive interference signals. An electronic amplifier system installed within the optoelectronic package amplifies an output of at least two optical detectors. Also disclosed is an integrated optical coherence tomography system. Embodiments are provided in which the amplifiers, typically transimpedance amplifiers, are closely integrated with the optical detectors that detect the interference signals from the interferometer. Further embodiments are provided in which the interferometer but also preferably its detectors are integrated together on a common optical bench. Systems that have little or no optical fiber can thus be implemented.

23 Claims, 8 Drawing Sheets

(56) References Cited

U.S. PATENT DOCUMENTS

| | | | |
|---|---|---|---|
| 6,381,066 B1* | 4/2002 | Korn et al. | 359/344 |
| 6,385,358 B1 | 5/2002 | Everett et al. | |
| 6,528,777 B2 | 3/2003 | Ames et al. | |
| 6,625,372 B1 | 9/2003 | Flanders et al. | |
| 6,806,963 B1 | 10/2004 | Waelti et al. | |
| 7,061,618 B2 | 6/2006 | Atia et al. | |
| 7,415,049 B2 | 8/2008 | Flanders et al. | |
| 8,204,386 B2* | 6/2012 | Mahgerefteh et al. | 398/186 |
| 2003/0059175 A1* | 3/2003 | Bendelli et al. | 385/92 |
| 2005/0185900 A1 | 8/2005 | Farr | |
| 2005/0213103 A1 | 9/2005 | Everett et al. | |
| 2006/0072632 A1* | 4/2006 | Flanders et al. | 372/20 |
| 2006/0244973 A1* | 11/2006 | Yun et al. | 356/511 |
| 2007/0076223 A1 | 4/2007 | Podoleanu et al. | |
| 2009/0002713 A1 | 1/2009 | Ohbayashi et al. | |
| 2009/0018436 A1 | 1/2009 | Gey Van Pittius et al. | |
| 2009/0122322 A1 | 5/2009 | Pouet | |
| 2009/0185166 A1 | 7/2009 | Oldenburg et al. | |
| 2009/0284749 A1* | 11/2009 | Johnson et al. | 356/497 |
| 2009/0290167 A1* | 11/2009 | Flanders et al. | 356/497 |
| 2009/0310141 A1* | 12/2009 | Miyata | 356/487 |
| 2010/0128279 A1 | 5/2010 | Cho et al. | |
| 2010/0201946 A1 | 8/2010 | Murakaimi | |
| 2010/0309480 A1* | 12/2010 | Furusawa et al. | 356/519 |
| 2011/0051143 A1 | 3/2011 | Flanders et al. | |
| 2011/0051148 A1 | 3/2011 | Flanders et al. | |
| 2011/0075153 A1 | 3/2011 | Hogan | |
| 2013/0100456 A1* | 4/2013 | Yu et al. | 356/479 |

FOREIGN PATENT DOCUMENTS

| | | | |
|---|---|---|---|
| WO | 2010067813 A1 | 6/2010 | |
| WO | 2010111795 A1 | 10/2010 | |

OTHER PUBLICATIONS

"Balanced polarization diversity detector for PS-OCT," Operation Manual—Thorlabs Instrumentation, Thorlabs GmbH, 2009, Accessed Mar. 7, 2012, (http://www.thorlabs.com/Thorcat/19300/19384-D02.pdf), 26 pages.

International Search Report, mailed on Mar. 21, 2012, from International Application No. PCT/US2011/065394, filed on Dec. 16, 2011.

International Preliminary Report on Patentability and the Written Opinion of the International Searching Authority mailed Jul. 11, 2013, from counterpart International Application No. PCT/US2011/065394, filed on Dec. 16, 2011.

* cited by examiner

INTEGRATED OCT DETECTOR SYSTEM WITH TRANSIMPEDANCE AMPLIFIER

RELATED APPLICATIONS

This application is related to U.S. patent application Ser. No. 12/981,783 (now U.S. Pat. Publ. No. US 2012/0170046 A1), filed on an even date herewith, entitled "Integrated Optical Coherence Tomography System" by Inventor Dale C. Flanders, which is incorporated herein by reference in its entirety.

BACKGROUND OF THE INVENTION

Optical coherence analysis relies on the use of the interference phenomena between a reference wave and an experimental sample wave or between two parts of a sample wave to measure distances and thicknesses, and calculate indices of refraction of a sample. Optical Coherence Tomography (OCT) is one example technology that is used to perform usually high-resolution cross sectional imaging. It is often applied to imaging biological tissue structures, for example, on microscopic scales in real time. Optical waves are reflected from an object or sample and a computer produces images of in depth cross sections of the object by using information on how the waves are changed upon reflection and by scanning optical waves across the sample surface.

The original OCT imaging technique was time-domain OCT (TD-OCT), which used a movable reference mirror in a Michelson interferometer arrangement. Subsequently, Fourier Domain OCT (FD-OCT) techniques have been developed. One example is time-encoded FD-OCT, which uses a wavelength swept source and a single detector; it is referred to as Swept Source OCT (SS-OCT). Another example is spectrum encoded FD-OCT, which uses a broadband source and spectrally resolving detector system.

These various OCT techniques offer different performance characteristics. FD-OCT has advantages over TD-OCT in speed and signal-to-noise ratio (SNR). Of the two FD-OCT techniques, swept-source FD-OCT has distinct advantages over spectrum-encoded FD-OCT because of its capacity for balanced and polarization diversity detection; it has advantages as well for imaging in wavelength regions where inexpensive and fast detector arrays, which are typically required for spectrum encoded FD-OCT, are not available.

Swept source OCT has advantages in some additional respects. The spectral components are not encoded by spatial separation, but they are encoded in time. The spectrum is either filtered or generated in successive frequency steps and reconstructed before Fourier-transformation. Using the frequency scanning swept source, the optical configuration becomes less complex but the critical performance characteristics now reside in the source and especially its tuning speed and accuracy.

The swept sources for swept-source FD-OCT have been typically tunable lasers. The advantages of tunable lasers include high spectral brightness and relatively simple optical designs. The tunable lasers are constructed from a gain medium, such as a semiconductor optical amplifier (SOA), that is located in a resonant optical cavity which also includes a tunable filter such as a rotating grating, grating with a rotating mirror, or a Fabry-Perot tunable filter. Currently, some of the highest speed tunable lasers are based on the laser designs described in U.S. Pat. No. 7,415,049 B1, entitled Laser with Tilted Multi Spatial Mode Resonator Tuning Element, by D. Flanders, M. Kuznetsov and W. Atia. These highly integrated designs allow for a short laser resonant cavity that keeps the round-trip optical travel times within the laser resonant cavity short so that the laser is fundamentally capable of high speed tuning Secondly, the use of microelectro-mechanical system (MEMS) Fabry-Perot tunable filters combines the capability for wide spectral scan bands with the low mass high mechanical resonant frequency deflectable MEMS mirror membranes, which also have the capacity for high speed tuning.

Another class of swept sources that have the potential to avoid some of the inherent drawbacks of tunable lasers, such as sweep speed limitations, is filtered amplified spontaneous emission (ASE) sources that combine a spectrally broadband light source, typically a source that generates light by ASE, with tunable optical filters and optical amplifiers.

Some of the highest speed devices based on filtered ASE sources are described in U.S. Pat. No. 7,061,618 B2, entitled Integrated Spectroscopy System, by W. Atia, D. Flanders P. Kotidis, and M. Kuznetsov, which describes tunable light sources. A number of variants of the filtered ASE swept source are described, including amplified versions and versions with tracking filters.

Two metrics that characterize the performance of OCT systems hardware are optical interferometer mechanical stability and the electronic bandwidth of the electronic signal processing systems. Many times, the OCT system interferometers are constructed from lengths of optical fiber. Mechanical movement, shock and stress of the optical fiber in these interferometers can affect the propagation of the optical signals in the fiber in terms of optical signal phase and polarization and this can impact system performance of such interferometric optical systems. The sufficiently high electronic bandwidth, also, becomes increasingly important as higher speed, performance and resolution OCT systems are produced. For example, increasing the wavelength tuning speed of the swept source, which produces higher OCT image acquisition speeds, also results in greater requirements for the electronics that are used to sample the resulting optical interference signals.

SUMMARY OF THE INVENTION

The present invention concerns innovations in terms of the integration of the optical interferometer and its detector systems. Embodiments are proposed in which the electronic signal amplifiers, typically transimpedance amplifiers, are closely integrated with the optical detectors that detect the interference signals from the interferometer. Further embodiments are proposed in which the interferometer, but also preferably its detectors, are integrated together on a common optical bench. Systems that have little or no optical fiber can thus be implemented. This yields a highly stable interferometer that is robust against fiber movement, strain and shock. Additionally, the interferometer can be highly compact, enabling lower-cost systems and facilitating the deployment of OCT into new applications that are enabled by such a small size. The inventive OCT optical interferometer and detection systems also have the capability for highly robust optical polarization diversity detection.

In general, according to one aspect, the invention features an optical detector system comprising a hermetic optoelectronic package, which is preferably hermetic, an optical bench installed within the optoelectronic package, a balanced detector system installed on the optical bench, the balanced detector system including at least two optical detectors that receive interference signals, and an electronic amplifier system installed within the optoelectronic package for amplifying an output of the at least two optical detectors.

Preferably, the electronic amplifier is also installed on the optical bench.

In embodiments, the hermetic optoelectronic package comprises two fiber feedthroughs for receiving a first optical signal and a second optical signal. In examples, the first optical signal and the second optical signal are the interference signals generated by a fiber optic combiner.

In one embodiment, the balanced detector system comprises at least four of the optical detectors, and the optical detector system comprises two polarization beam splitters for transmitting the interference signals having a first polarization to a first pair of the optical detectors and transmitting the interference signals having a second polarization to a second pair of the optical detectors. In this case, the electronic amplifier system comprises a first electronic amplifier for amplifying the output of the first pair of the optical detectors and a second electronic amplifier for amplifying the output of the second pair of the optical detectors.

In some embodiments, an ancillary detector is installed on the optical bench that receives an ancillary optical signal to determine a spectral response of the sample, for example.

In general, according to one aspect, the invention features an optical detector system comprising an optical bench, at least one beam splitter/combiner installed on the bench that generates interference signals from a sample optical signal from a sample arm and a reference optical signal from a reference arm, a balanced detector system installed on the optical bench. The balanced detector system includes at least two optical detectors that receive the interference signals. An electronic amplifier system installed on the optical bench amplifies an output of the at least two optical detectors.

Preferably, the optical bench is installed within a hermetic optoelectronic package that comprises two fiber feedthroughs for receiving the sample optical signal and the reference optical signal.

In general according to another aspect, the invention features an optical detector system comprising an optical bench installed within the optoelectronic package, a first pair of the optical detectors installed on the optical bench, a second pair of the optical detectors installed on the optical bench, and two polarization beam splitters for transmitting interference signals having a first polarization to the first pair of the optical detectors and transmitting the interference signals having a second polarization to the second pair of the optical detectors.

Preferably, a beam splitter/combiner is also installed on the bench for generating the interference signals.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
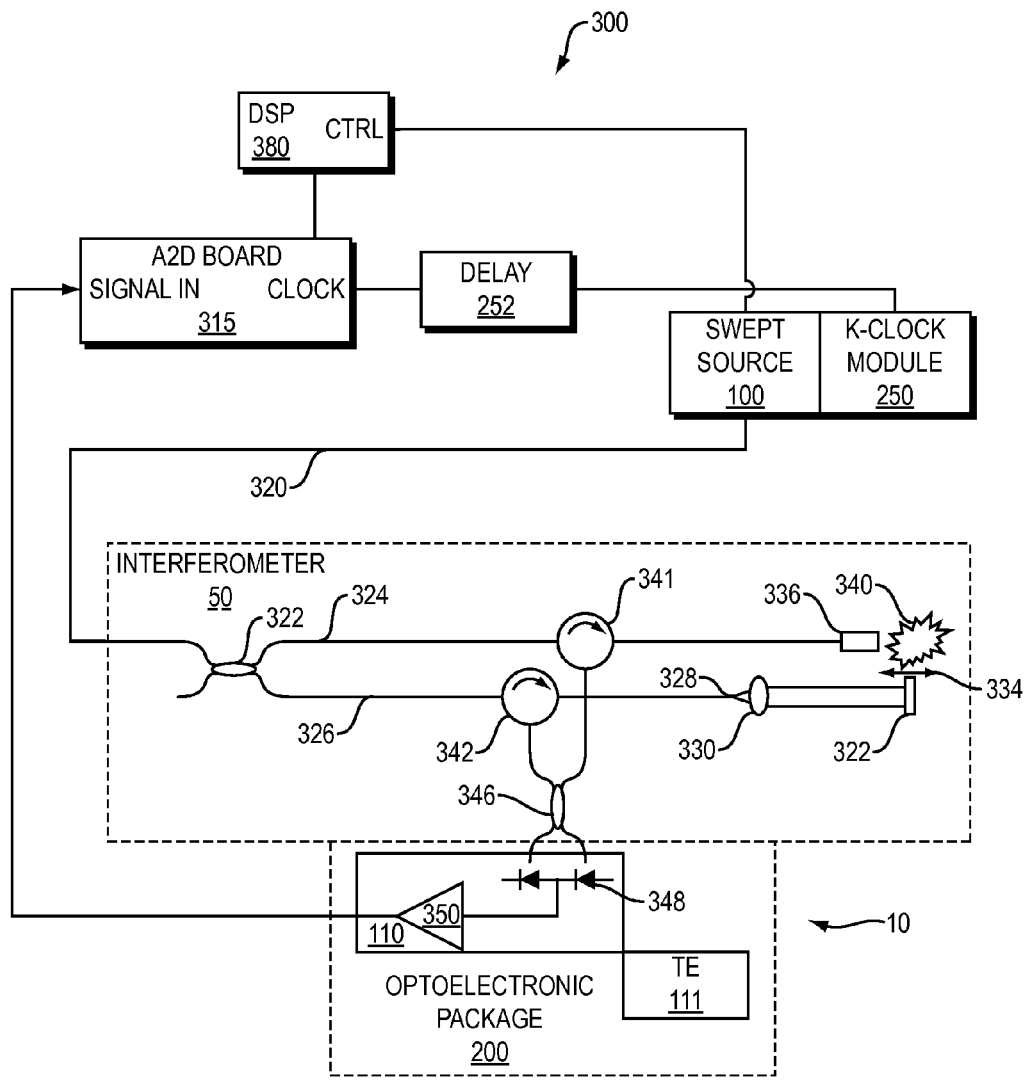
FIG. 1 is a schematic view of an OCT system with a swept source, interferometer, and integrated detector system according to an embodiment of the invention.

FIG. 1 shows an optical coherence analysis system 300 including an integrated detector system 10, which has been constructed according to the principles of the present invention.

A swept source system 100 generates a tunable optical signal on optical fiber 320 that is transmitted to interferometer 50. In the preferred embodiment, this tunable optical signal scans over a spectral scan band with a narrowband emission.

In one embodiment, the swept source 100 is a tunable laser. In one example, a tunable laser is used as described in U.S. Pat. No. 7,415,049 B1, which is incorporated herein in its entirety by this reference. In other embodiments, a filtered ASE swept source is used as described in: 1) U.S. patent application Ser. No. 12/553,295, now U.S. Pat. Publ. No. US 2011/0051148 A1, entitled Filtered ASE Swept Source for OCT Medical Imaging, filed on Sep. 3, 2009 by Flanders, et al. or 2) U.S. patent application Ser. No. 12/776,373, now U.S. Pat. Publ. No. US 2011/0051143 A1, entitled ASE Swept Source with Self-Tracking Filter for OCT Medical Imaging, filed on May 8, 2010 by Flanders, et al., both of these applications being incorporated herein by this reference in their entirety.

Preferably, the swept source system 100 also comprises a k-clock module 250. The k-clock module generates a clocking signal at equally spaced optical frequency increments as the tunable optical signal from the swept source 100 is tuned over the scan band. A delay 252, such as an electronic delay, is preferably included to match the A2D clock trigger delay to the delay of the optical signals in the interferometer.

An interferometer 50 is used to analyze the optical signals from a sample 340. The tunable signal from the swept source module 100 is transmitted on fiber 320 to an optical coupler 322, such as a 90/10 coupler. The tunable signal is divided by the coupler 322 between a reference arm 326 and a sample arm 324 of the interferometer 50.

A reference arm circulator 342 is provided to redirect returning light. The optical fiber of the reference arm 326 terminates at the fiber endface 328. The light exiting from the reference arm fiber endface 328 is collimated by a lens 330 and then reflected by a mirror 332 to return back.

The external mirror 332 has an adjustable fiber to mirror distance (see arrow 334), in one example. This distance determines the depth range being imaged, i.e. the position in the sample 340 of the zero path length difference between the reference arm 326 and the sample arm 324. The distance is adjusted for different sampling probes and/or imaged samples. Light returning from the reference mirror 332 is returned to the reference arm circulator 342 and directed to a 50/50 fiber coupler 346.

A sample arm circulator 341 is provided to redirect returning light from the sample 340. The fiber on the sample arm 324 terminates at the sample arm probe 336. The exiting light is focused by the probe 336 onto the sample 340. Light returning from the sample 340 is returned to the sample arm circulator 341 and directed to the 50/50 fiber coupler 346. The reference arm signal and the sample arm signal are combined in the fiber coupler 346 to generate interference signals.

The interference signals are received in the integrated detector system 10. The interference signals are detected by a balanced receiver, comprising two detectors 348, at each of the outputs of the fiber coupler 346. The electronic interference signal from the balanced receiver 348 is amplified by transimpedance amplifier 350.

The two detectors 348 along with the transimpedance amplifier 350 are integrated together on a common optical bench 110. This bench 110 is further installed within an optoelectronic package 200.

The integration of the detectors 348 on a common optical bench 110 along with the transimpedance amplifier 350 improves the electronic performance of the system. The conductors that are used to connect the balanced receiver detectors 348 to the transimpedance amplifier 350 are relatively short in length. This lowers electrical resistance and capacitance. Moreover, the temperature of the transimpedance amplifier 350, as well as of the balanced receiver 348, can now be stabilized by a thermoelectric cooler 111. In one embodiment, the thermoelectric cooler 111 is installed between the bench 110 and the optoelectronic package 200. This enables the cooler 111 to remove heat generated on the bench 110 from the package. This cooler 111 is not used in other embodiments, however.

An analog to digital converter system 315 is used to sample the interference signal output from the amplifier 350. Frequency clock and sweep trigger signals derived from the k-clock module 250 are used by the analog to digital converter system 315 to synchronize system data acquisition with the optical frequency tuning of the swept source system 100.

A complete data set is collected from the sample 340 by scanning the optical beam over the sample and tuning the swept source. This is typically accomplished by spatially raster scanning the focused beam from probe 336 relative to the sample 340, in a Cartesian geometry, x-y, fashion or a cylindrical geometry theta-z fashion, and the spectral response at each one of these points is generated from the frequency tuning of the swept source 100. The digital signal processor 380 performs a Fourier transform on the data in order to generate a 2D or 3D tomographic reconstruction of the sample 340. This information generated by the digital signal processor 380 can then be displayed on a video monitor.

In one application, the probe 336 is inserted into blood vessels and used to scan the inner wall of arteries and veins. In other examples, other analysis modalities are included in the probe such as intravascular ultrasound (IVUS), forward looking IVUS (FLIVUS), high-intensity focused ultrasound (HIFU), pressure sensing wires and image guided therapeutic devices. In another medical application, an ophthalmic probe is used to scan and produce an OCT image of anterior or posterior of the eye, such as an eye retina. Such diagnostic imaging can also be used for image guided therapy and combined with therapeutic modalities, such as laser surgery.

Figure 2:
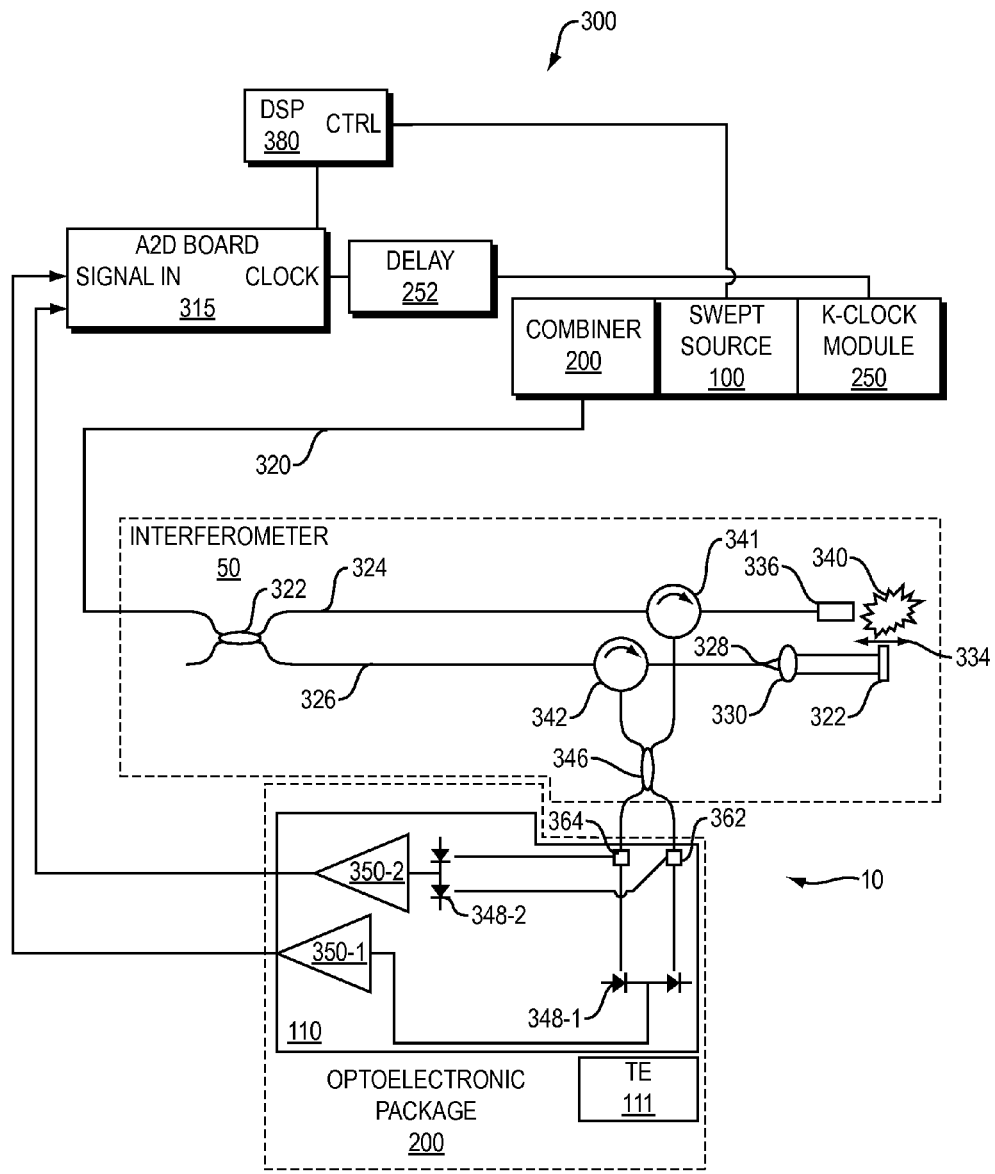
FIG. 2 is a schematic view of an OCT system with a swept source according to another embodiment of the invention incorporating an integrated polarization diversity optical detector system.

FIG. 2 shows an optical coherence analysis system 300 that has been constructed according to a second embodiment of the present invention.

The integrated detector system 10 has the capacity to separate the interference signals into portions having different polarizations. Specifically, a first polarization beam splitter 362 and a second polarization beam splitter 364 are used to separate the orthogonal polarization components of the interference signals generated by coupler 346.

Two balanced detectors 348-1 and 348-2 are used to separately detect the interference signals of the two polarizations. Their outputs are amplified by respective transimpedance amplifiers 350-1, 350-2.

Here also, the two balanced detectors 348-1 and 348-2 along with the transimpedance amplifiers 350-1, 350-2 are integrated together on a common optical bench 110, along with other optical components such as the first polarization beam splitter 362 and a second polarization beam splitter 364. This bench 110 is further installed within an optoelectronic package 200.

The integration of the detectors 348-1 and 348-2 on a common optical bench 110 along with the transimpedance amplifiers 350-1, 350-2 improves the electronic performance of this system also by lowering electrical resistance and capacitance between the detectors and amplifiers. Moreover, the temperature of the transimpedance amplifiers 350-1, 350-2 can now be stabilized by an optional thermoelectric cooler 111 that is also used to stabilize the temperature of the detectors 348-1 and 348-2 and other optical components.

Figure 3:
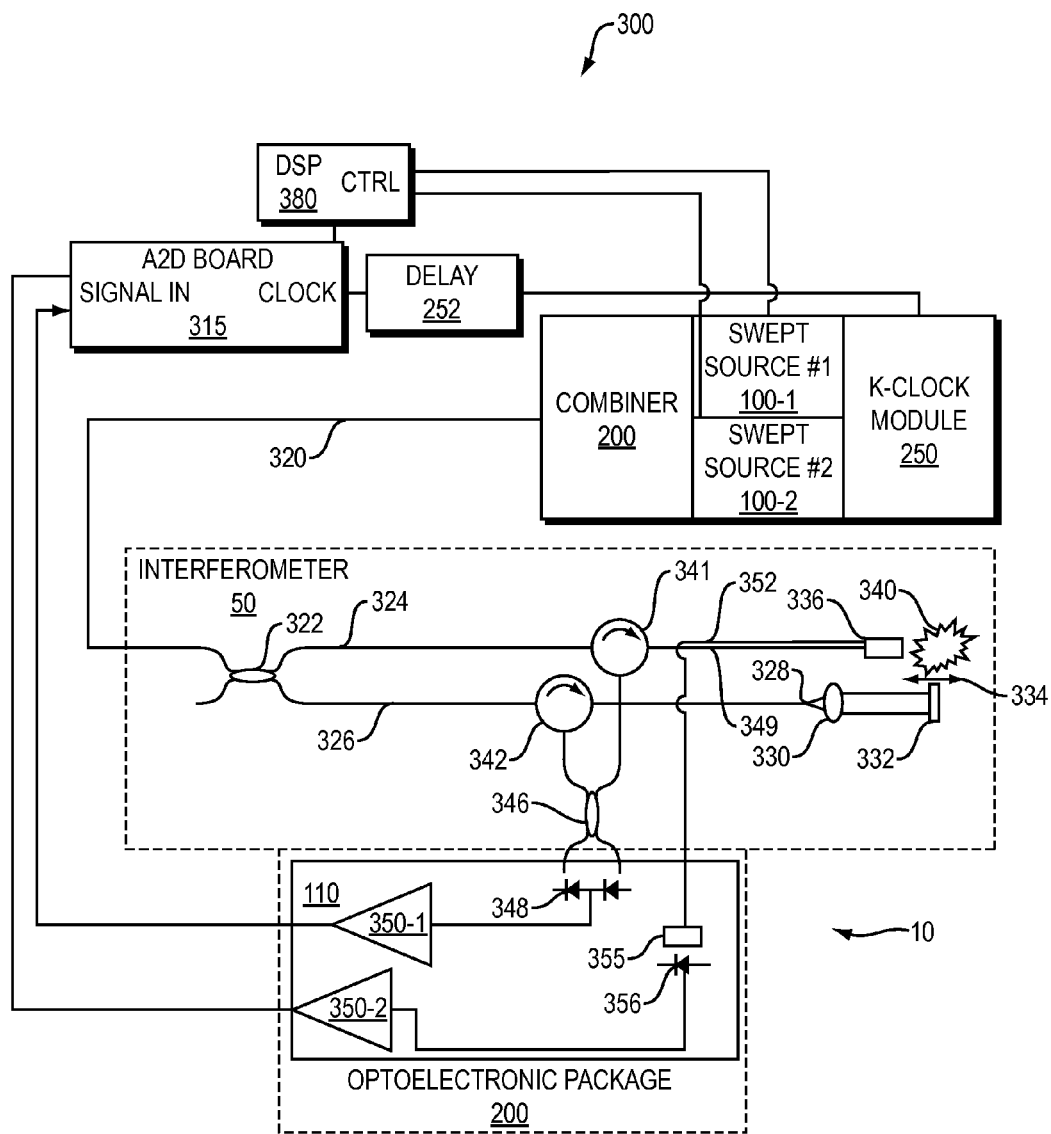
FIG. 3 is a schematic view of an OCT system with a dual swept source according to another embodiment of the invention incorporating spectral analysis functionality provided by an ancillary detector in an integrated optical detector system.

FIG. 3 shows an optical coherence analysis system 300 that has been constructed according to a third embodiment of the present invention.

This third embodiment includes the capability to perform spectroscopic or other optical analysis on the sample 340.

In more detail, in the preferred embodiment, two optical fibers are provided to the probe 336. Optical fiber 350 transmits combined signal including first tunable optical signal generated by a first swept source 100-1 and the second tunable optical signal generated by a second swept source 100-2 to the probe 336, which directs the signals to the sample 340. Light returning from the sample 340 that is used for optical coherence analysis returns on optical fiber 350 to circulator 341. This returning light is processed as described in the previous embodiments to generate an optical coherence analysis of the sample 340.

In contrast, light that is used for spectral analysis of the sample 340 is coupled from the probe on optical fiber 352. This spectral analysis light is detected by an ancillary or spectral analysis detector 356. In one implementation, a filter and collimator element 355 are used to direct the light onto the spectral analysis detector 356 and also possibly remove any spectral components that are related to the optical coherence analysis of the sample 340.

In one implementation, the first swept source 100-1 is used for optical coherence analysis. The second swept source 100-2 is used for spectral analysis of the sample 340. Typically, these two swept sources will operate with different spectral scan bands. In this implementation, the filter and collimator element 355 is a WDM filter that transmits only the scanband generated by the second swept source 100-2.

In still a further implementation, the spectral analysis of the sample 340 is performed at the same spectral regions as the optical coherence analysis. In this case the filter and collimator element 355 passes the spectral components associated with both the first swept source 100-1 and the second swept source 100-2 and the detector 356 detects the spectral response of the sample 340 in a time multiplexed fashion.

Alternatively, when the first swept source 100-1 in the second swept source 100-2 operate in different spectral scan bands, then the filter and collimator element 355 allows the light from only one of these scan bands to reach the detector 356 when they cannot be separated in time.

Here again, an integrated detector system 10 is used in which the optoelectronic detectors 348, 356 are integrated together on a common optical bench 110 and within a common optoelectronic package 200. Further the amplifiers 350-1, 350-2 associated with the balanced detectors 348 and the ancillary detector 356 are also preferably installed on the bench 110.

Figure 4:
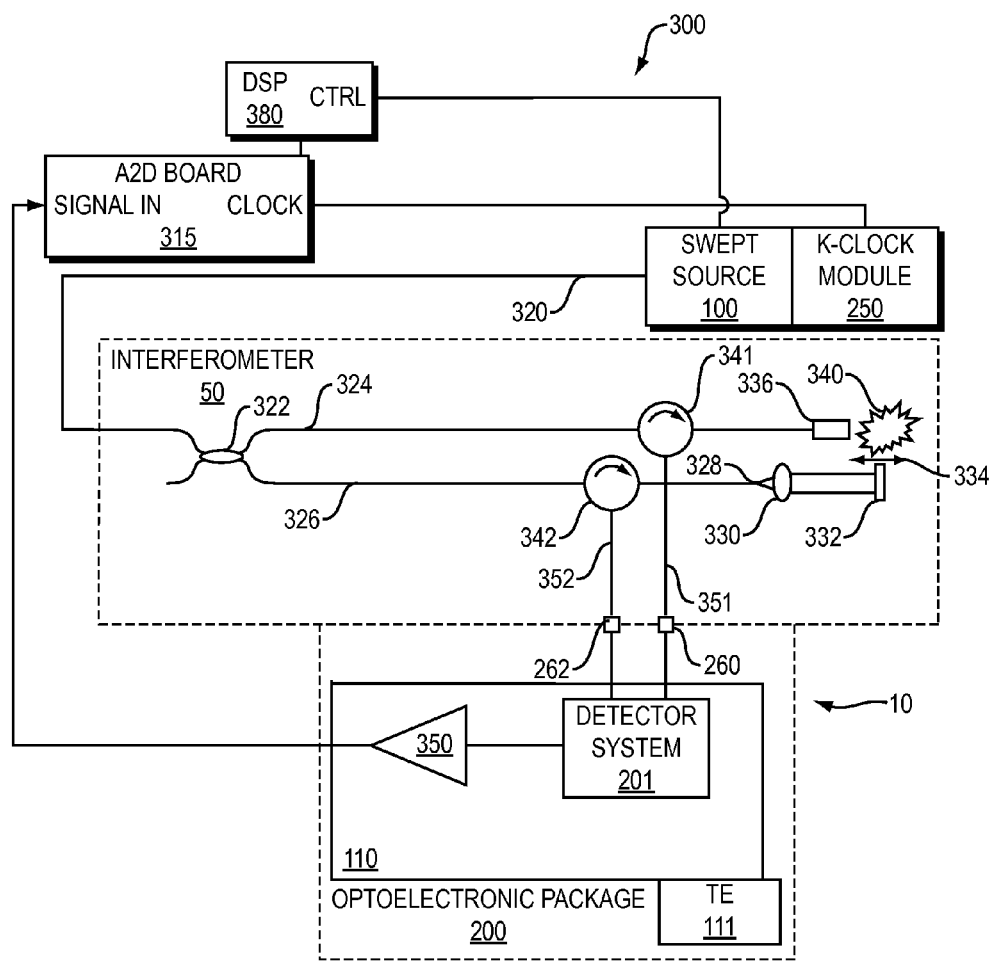
FIG. 4 is a schematic view of an OCT system in which the interference signals are generated in an integrated optical detector system.

FIG. 4 shows still another embodiment of the integrated detector system 10.

In this embodiment, optical fiber 351 carries the optical signals from the sample arm circulator 341 through a fiber feedthrough 260 in the optoelectronic package 200. Similarly, optical fiber 352 carries the optical signals from the reference arm circulator 342 through the fiber feedthrough 262 in the optoelectronic package 200.

In this embodiment, the interference signals are not generated by a fiber coupler. Instead, the optical signals from the sample arm 324 and the reference arm 326 are fed directly into a detector system 201. As described previously, this detector system 201 is installed on an optical bench 110 along with a transimpedance amplifier system 350. Both of these components are located within the optoelectronic package 200.

This embodiment has advantages in that the interference signals need not be generated by a fiber coupler. Instead they are generated within the detector system 201 on a common optical bench 110 such as by a beam splitter/combiner. This makes the system more robust against shock and stress to optical fiber components. Moreover, it allows for the thermal stabilization by the thermoelectric cooler 111.

Figure 5:
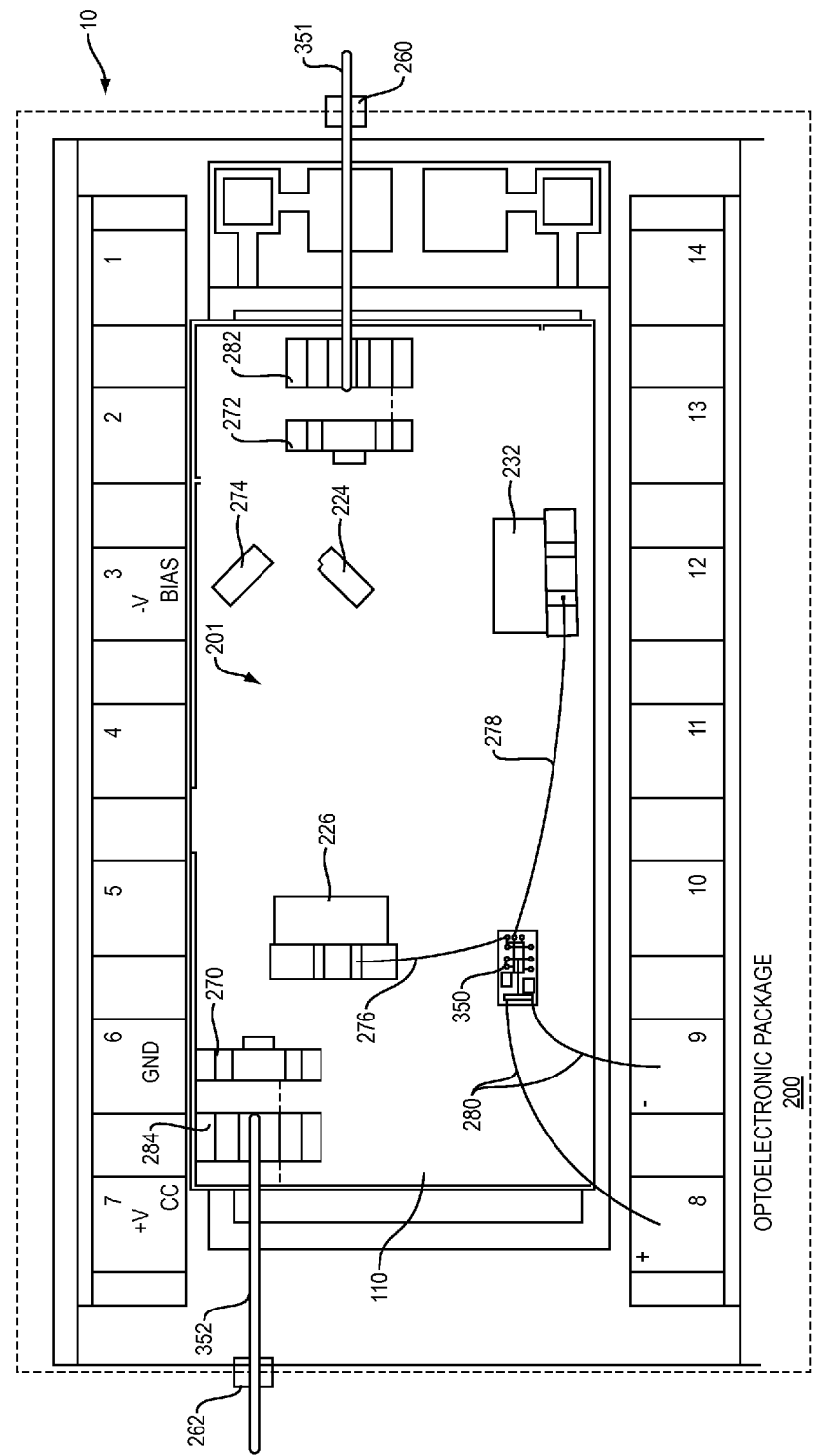
FIG. 5 is a scale top plan view of an integrated optical detector system.

FIG. 5 shows one embodiment of the integrated detector system that is compatible with the OCT system illustrated in FIG. 4.

In more detail, the optical signal from the sample arm is received on optical fiber 351 through a feedthrough 260 in the optoelectronic package 200. The end facet of optical fiber 351 is secured onto optical bench 110 via a mounting structure 282. This mounting structure and the other mounting structures are disclosed in U.S. Pat. No. 6,625,372 B1, for example.

The optical signal from the sample arm is collimated by a lens optical component 272, which includes a mounting structure and a lens substrate. This optical signal is received by an interference beam splitter/combiner 224.

In a similar vein, light from the reference arm is received on optical fiber 352 through fiber feedthrough 262. The fiber end face is secured to the optical bench 110 via mounting structure 284.

The reference arm light is collimated by a second lens optical component 270. The light is directed to a fold mirror 274 to be received at the interference beam splitter/combiner 224.

The interference beam splitter/combiner 224 generates the interference signals through the optical interference of the light from the sample arm 324 with the light from the reference arm 326. These interference signals are then detected by a first detector 226 and a second detector 232. These detectors 226, 232 form a balanced detector or receiver system.

Electrical conductors 276 and 278, or wire bonds, electrically connect the first detector 226 and the second detector 232 to a transimpedance amplifier 350 that is secured to the top of the optical bench 110. In the preferred embodiment, the transimpedance amplifier 350 is a bare silicon chip that is bonded directly to the optical bench 110. Electrical conductor or wire bonds 280 connect the transimpedance amplifier 350 to the wire bond pads 8, 9 of the optoelectronic package 200.

In this way, this embodiment provides for the generation of the interference signals directly on the optical bench 110. Moreover, the installation of the transimpedance amplifier die 350 on the bench 110 provides for short electrical connections 276, 278 between the amplifier 350 and the first detector 226 and the second detector 232. This minimizes electrical resistance between these components and also decreases capacitance providing for high-speed high electrical bandwidth operation.

Figure 6:
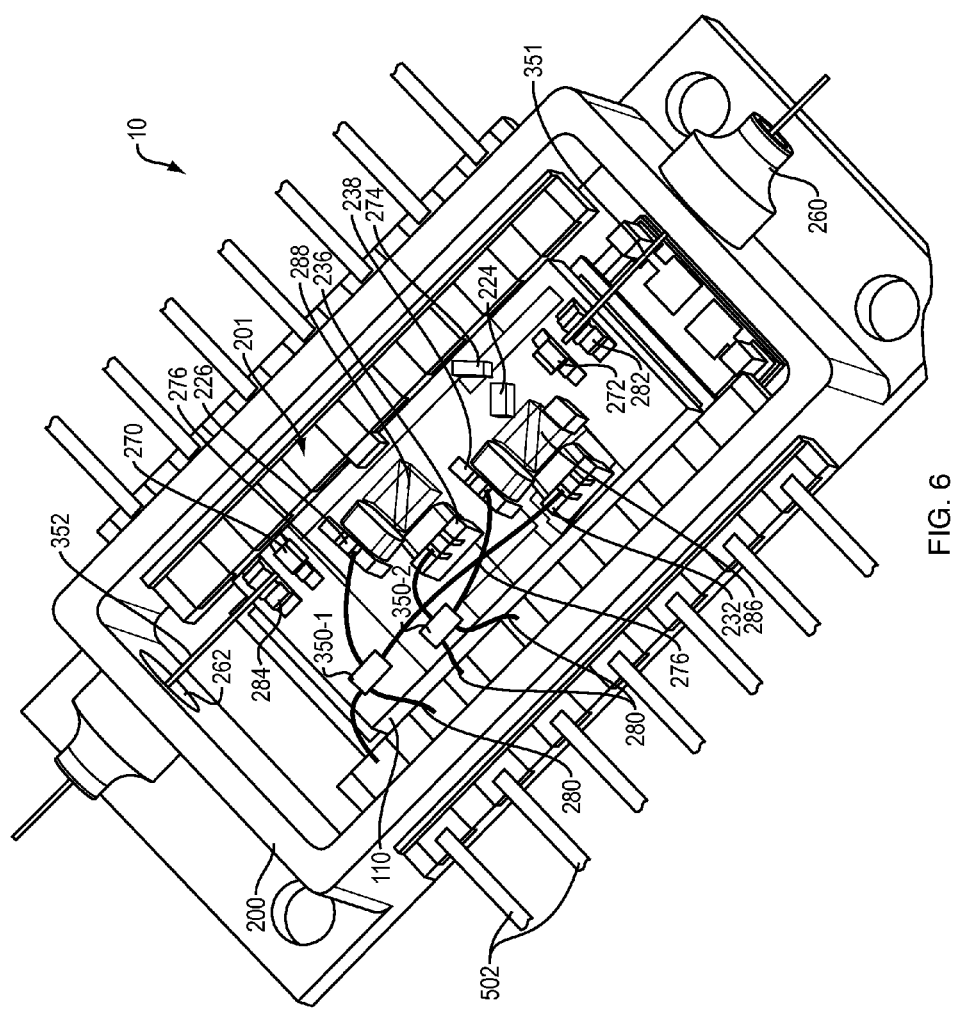
FIG. 6 is a scale perspective view of an integrated optical detector system providing polarization diversity detection.

FIG. 6 shows another embodiment of the integrated detector system 10 that is compatible with the OCT system illustrated in FIG. 4.

In this embodiment, the optical signals from the reference arm and the sample arm are transmitted to the interference beam splitter/combiner 224 as described in the previous embodiment. The interference signals generated by the beam splitter/combiner 224, however, are received by a first polarization beam splitter 286 and a second polarization beam splitter 288. These beam splitters 286, 288 are configured to transmit a first polarization and reflect a second orthogonal polarization.

A first balanced receiver comprises a first detector pair including a first detector 226 and a second detector 232. A second balanced receiver comprises a second detector pair including a first detector 236 and a second detector 238. That is, since the polarization beam splitters 286 and 288 transmit a first polarization, then the first pair of detectors of the first balanced receiver includes detectors 226 and 232. Similarly, since the polarization beam splitters 286, 288 reflect the second polarization, the second balanced receiver comprises detectors 236 and 238.

Two transimpedance amplifiers 350-1, 350-2 respectively receive the signals from the first balanced receiver and the second balanced receiver. In more detail, transimpedance amplifier 350-1 amplifies the output of detector 226 and detector 232. Transimpedance amplifier 350-2 amplifies the output of detector 236 and 238.

Wire bonds 276 connect the transimpedance amplifiers 350-1, 350-2 to the respective detectors 226, 232, 236, 238. The electrical output of the transimpedance amplifiers is then connected to the bond pads of the package 200 via wire bonds 280. The leads 502 of the optoelectronic package 200 provide the amplified output of the transimpedance amplifiers 350 along with the power input to power those amplifiers 350.

Here again, this embodiment provides for high bandwidth operation due to the installation of the transimpedance amplifiers 350-1, 350-2 on a common optical bench 110 with the optical detectors 226, 232, 236, 238. Moreover, the interference signals are similarly generated directly on the bench 110 at the interference beam splitter/combiner 224. This further improves the robustness against a mechanical shock and thermal instability.

Figure 7:
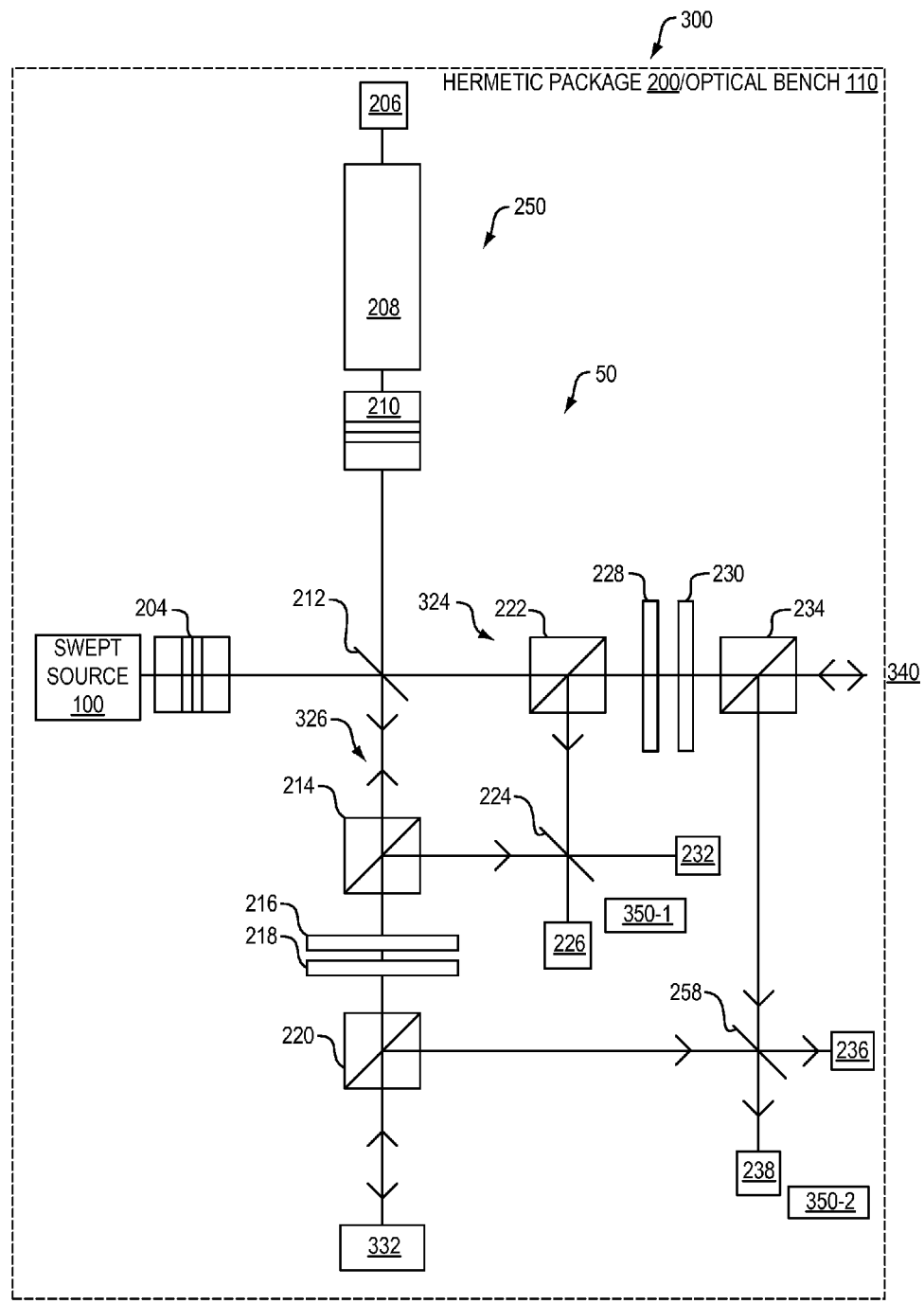
FIG. 7 is a schematic top plan view of an integrated OCT system according to a first embodiment.

FIG. 7 illustrates an integrated OCT system 300. Here, the entire OCT system is integrated within a single hermetic package 200 and on a common optical bench 110. This configuration maximizes the mechanical stability of the system since all of the optical paths are on a common optical bench 110. The installation within a common hermetic package 200 provides for an extremely compact and small system. For example, in one embodiment, the optical bench 110 less than 150 millimeters long and less than 150 millimeters in width. Preferably, the optical bench 110 less than 100 millimeters long and less than 100 millimeters in width.

In more detail, a swept optical source 100 generates a tunable optical signal that is received by the interferometer 50. In one embodiment, the swept source 100 is a tunable laser. In one example, a tunable laser is used as described in U.S. Pat. No. 7,415,049 B1. In other embodiments, a filtered ASE swept source is used as described in: 1) U.S. patent application Ser. No. 12/553,295, entitled Filtered ASE Swept Source for OCT Medical Imaging, filed on Sep. 3, 2009 by Flanders, et al. or 2) U.S. patent application Ser. No. 12/776,373, entitled ASE Swept Source with Self-Tracking Filter for OCT Medical Imaging, filed on May 8, 2010 by Flanders, et al.

In a highly compact design, the swept source 100 is implemented on the optical bench 110 and within the package 200.

An isolator 204 prevents back reflections from the interferometer 50 from interfering with the operation of the source 100.

An interferometer beam splitter 212 receives the tunable swept source signal. It divides the tunable signal between a sample arm 324 and a reference arm 326 of the interferometer 50. In a typical embodiment, the interferometer beam splitter 212 is not a 50-50 splitter. Instead, a majority of the light is directed on to the sample arm 324 since it experiences higher losses on signal reflection from the sample 340.

The tunable signal on the sample arm 324 is transmitted through a first polarization beam splitter 222. A tunable signal is then transmitted through a non-reciprocal polarization element that is constructed from a Faraday rotator 228 and a half wave plate 230. This combination of elements has the effect of yielding no net rotation of the polarization of the tunable signal from the swept source 100. As a result, the tunable signal is transmitted through a second polarization beam splitter 234 and to the sample 340.

Light returning from the sample 340 is first received at the second polarization beam splitter 234. For the sample-reflected light that has as a polarization that is orthogonal to the polarization of the swept source 100, this polarization is reflected to a second detector interference splitter/combiner 258.

In contrast, light returning from the sample 340 that has a polarization that is parallel to the polarization of the swept source 100 is transmitted through the second polarization beam splitter 234.

The non-reciprocal polarization element, comprising the Faraday rotator 228 and the half wave plate 230, functions to rotate the polarization of the light returning from the sample 340 to a polarization that is orthogonal to the polarization of the swept source 100. This operation is due to the non-reciprocal operation of the Faraday rotator 228 in dependence upon the direction of propagation of the light through the rotator.

The light that returns from the sample that is received by the first polarization beam splitter 222 is now reflected to a first detector interference splitter/combiner 224.

In the reference arm 326, the light from the swept source 100 passes through a first polarization beam splitter 214. In the preferred embodiment, the first reference arm polarization beam splitter 214 transmits the polarized light generated by the swept source 100.

A reference arm nonreciprocal polarization rotation element comprising a Faraday rotator 216 and a half wave plate 218 transmits the signal from the swept source 100 without any rotation of its polarization. As a result, the tunable signal is then transmitted through a second reference arm polarization beam splitter 220.

Light travels through the reference arm to a reflector 332. This reflects light back to the second reference arm polarization beam splitter 220.

The reflector 332, or other elements along the transmission path of the reference arm 326, rotates the polarization by 45 degrees, for example, so that both polarizations are present in the light returning from the reflector to the polarization beam splitter 220.

The returning light that has a polarization that is orthogonal to the polarization of the swept source is reflected by the second reference arm polarization beam splitter 220 and directed to the second detector interference splitter/combiner 258.

Light that is transmitted through the second reference arm polarization beam splitter 220 then passes through the half wave plate 218 and the Faraday rotator 216. The nonreciprocal rotation provided by this combination of elements functions to rotate the polarization of the returning beam to be orthogonal to the polarization of the tunable signal from the swept source 100. Thus, the first reference arm polarization beam splitter reflects the returning light to the first detector interference splitter/combiner 224.

The first detector interference splitter/combiner 224 and the second detector interference splitter/combiner 258 function to generate the interference signals for each of the polarizations. A first detector pair comprising balance detectors 226 and 232 detect the interference signals for the light that is parallel to the polarization of the swept source 100. A second detector pair comprising balanced detectors 236 and 238 detect the interference signals for the light that is perpendicular to the polarization of the swept source 100.

In one embodiment, a k-clock system 250 is also included on the optical bench 110 and within the hermetic package 200. In more detail, the light returning from the reference arm 326 is transmitted through the interferometer beam splitter 212 to a k-clock isolator 210. The light is then transmitted to a spectral filter 208 with a repeating transmission function. In one embodiment, the spectral filter 208 is a transmission or reflection etalon that has spectrally repeating transmission characteristics at its free spectral range. The transmitted light is then detected by a k-clock detector 206. This is used to trigger the sampling of the balanced detector pairs at equally spaced frequency increments of the tunable optical signal as it is scanned over its wavelength band by an analog to digital converter system as described with respect to the previous embodiments.

As described in the previous embodiments in the preferred embodiment, two transimpedance amplifiers 350-1, 350-2 are provided on the optical bench 110. The first transimpedance amplifier 350-1 amplifies the output from the balanced detector pair 226, 232. The second transimpedance amplifier 350-2 amplifies the output from the second balanced receiver pair 236, 238. This yields a highly compact system that also includes important high-speed electronics on the optical bench along with the other optical components.

Figure 8:
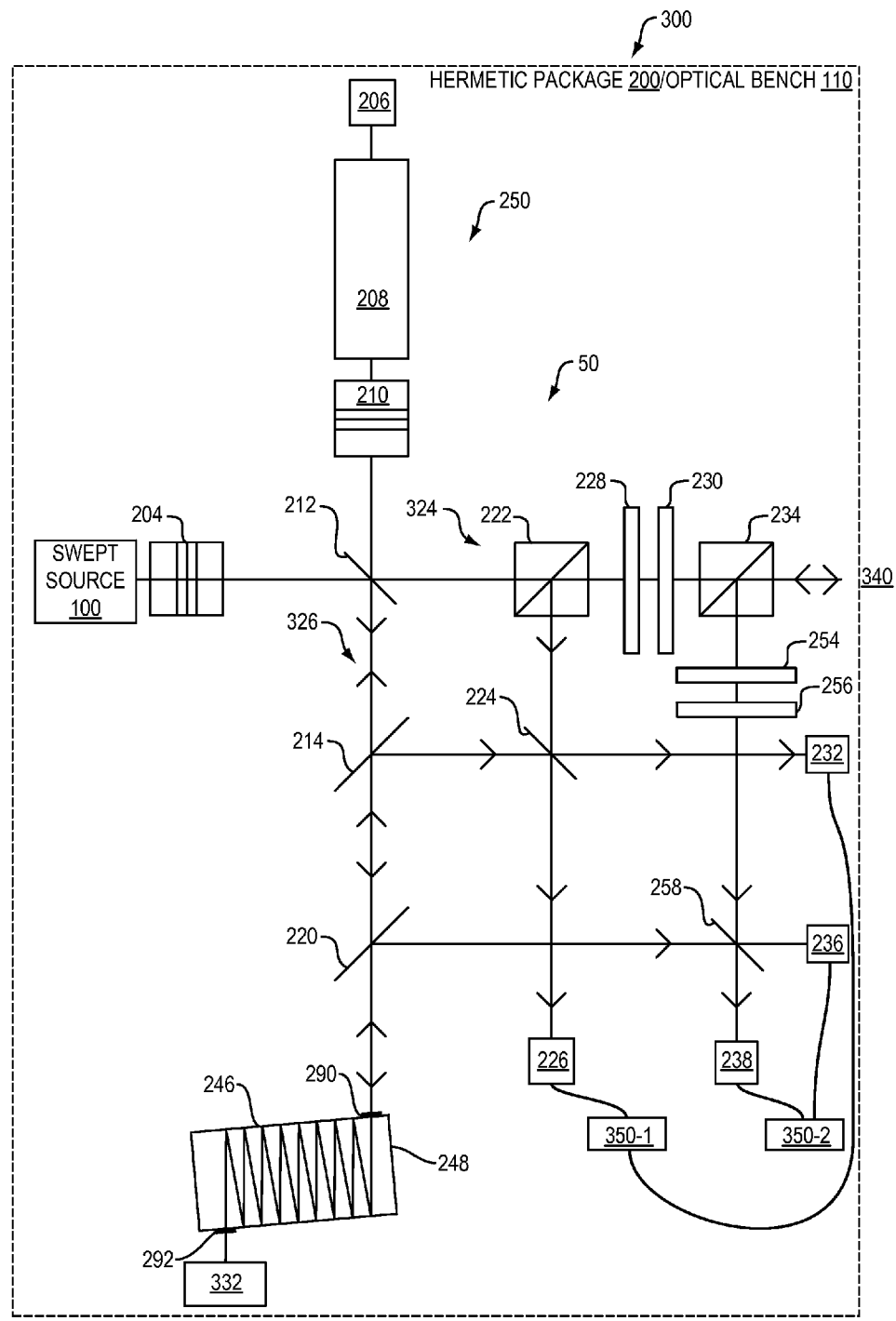
FIG. 8 is a schematic top plan view of an integrated OCT system according to another embodiment.

FIG. 8 illustrates another embodiment of the integrated OCT system 300. This embodiment differs from the integrated OCT system of FIG. 7 in that it avoids the need for birefringence in the reference arm 326. Further, it needs fewer polarization beam splitters.

In more detail, the tunable optical signal is generated and transmitted through the sample arm 324 as described previously with respect to FIG. 7.

Moreover, light returning from the sample 340 that has a polarization orthogonal to the tunable signal from the swept source 100 is reflected by the second sample arm polarization beam splitter 234. This reflected light is then transmitted through a nonreciprocal rotation element, comprising a Faraday rotator 254 and a half wave plate 256, to rotate polarization by 90°. These are provided to match the optical delay. As described previously, this light is then received by a second detector interference splitter/combiner 258. Alternatively, a 90° reciprocal polarization rotating element, such as a half wave plate, can be used to achieve the combined function of the elements 254 and 256.

Light that has a polarization that is parallel to the swept source that is returning from the sample 340 is transmitted through the sample arm nonreciprocal polarization rotation element comprising the Faraday rotator 228 and the half wave plate 230. This light is now reflected by the first sample arm polarization beam splitter 222 and directed to the first detector interference splitter/combiner 224.

The tunable signal that is reflected by the interferometer beam splitter 212 and transmitted on the reference arm 326 is transmitted through a first reference arm beam splitter 214 and a second reference arm beam splitter 220. In this embodiment, since the reference arm 326 functions without polarization diversity, both of the reference arm beam splitters 214, 220 induce loss in the reference arm 326, since a portion of the tunable signal is reflected by both of these elements and lost from the system.

The light on the reference arm then enters a reflective block 248. The reflective block 248 has sidewalls that are coated to be reflected to the tunable optical signal. There are two transmissive ports in the sidewalls, however. The tunable optical signal enters through a transmissive input port 290 then after multiple reflections, such as 10 to 20 or more, within the reflective block 248, the light exits through an output port 292 and is directed to a reflector 332.

The reflective block 248 functions to increase the path length of the reference arm 326. By controlling the size of the reflective block 248, and the number of reflections the tunable signal undergoes within the reflective block 248, the path length of the reference arm 326 is changed to match the path length of the sample arm 324.

A portion of the light returning from the reflector 332 in the reflective block 248 is reflected by the second sample arm beam splitter 220 and directed to the second detector interference splitter/combiner 258. Light that is transmitted through the second sample arm beam splitter 220 is then reflected by the first sample arm beam splitter 214 to the first detector interference splitter/combiner 224.

As described in the previous embodiment, k-clock system 250 is also included on the optical bench 110 and within the hermetic package 200. This component includes k-clock isolator 210, a spectral filter 208, and a k-clock detector 206. This is used to trigger the sampling of the balanced detector pairs at equally spaced frequency increments of the tunable optical signal as it is scanned over its scan band.

As described in the previous embodiments in the preferred embodiment, two transimpedance amplifiers 350-1, 350-2 are provided on the optical bench 110. The first transimpedance amplifier 350-1 amplifies the output from the balanced detector pair 226, 232. The second transimpedance amplifier 350-2 amplifies the output from the second balanced receiver pair 236, 238. This yields a highly compact system that also includes important high-speed electronics on the optical bench along with the other optical components.

While this invention has been particularly shown and described with references to preferred embodiments thereof, it will be understood by those skilled in the art that various changes in form and details may be made therein without departing from the scope of the invention encompassed by the appended claims.

What is claimed is:

1. An integrated optical detector system for use with an optical coherence analysis system, the integrated optical detector system comprising:
   an optoelectronic package having two separate fiber feedthroughs for receiving two separate optical fibers therethrough, a first optical fiber configured to transmit a first incoming optical signal from a sample arm and a second optical fiber configured to transmit a second incoming optical signal from a reference arm of an interferometer of an optical coherence analysis system;
   an optical bench installed within the optoelectronic package;
   a balanced detector system installed on the optical bench, the balanced detector system including at least two optical detectors for receiving interference signals generated by a fiber optic combiner of the interferometer based on the first and second optical signals;
   an electronic amplifier system installed on the optical bench within the optoelectronic package and in electrical communication with the at least two optical detectors, the electronic amplifier system including at least one electronic amplifier for amplifying an output of the at least two optical detectors; and
   at least one lead extending from the optoelectronic package and in electrical communication with the at least one electronic amplifier, the at least one lead configured to provide an amplified output to an analog to digital converter system of the optical coherence analysis system for sampling of the amplified output, and the at least one lead further configured to provide power input to the at least one amplifier.

2. An integrated optical detector system as claimed in claim 1, wherein the two separate fiber feedthroughs are positioned on opposing sides of the optoelectronic package.

3. An integrated optical detector system as claimed in claim 1, wherein the balanced detector system comprises at least four optical detectors, and the integrated optical detector system comprises two polarization beam splitters installed on the optical bench that separate the interference signals into a first portion having a first polarization and a second portion having a second polarization and further transmit the first portion of interference signals to a first pair of the optical detectors and transmitting the second portion of interference signals to a second pair of the optical detectors.

4. An integrated optical detector system as claimed in claim 3, wherein the electronic amplifier system comprises a first electronic amplifier for amplifying the output of the first pair of the optical detectors and a second electronic amplifier for amplifying the output of the second pair of the optical detectors.

5. An integrated optical detector system as claimed in claim 1, wherein the balanced detector system comprises at least four optical detectors, and the integrated optical detector system comprises two wavelength division beam splitters installed on the optical bench that transmit the interference signals within a first wavelength band to a first pair of the optical detectors and transmitting the interference signals within a second wavelength band to a second pair of the optical detectors.

6. An integrated optical detector system as claimed in claim 5, wherein the electronic amplifier system comprises a first electronic amplifier for amplifying the output of the first pair of the optical detectors and a second electronic amplifier for amplifying the output of the second pair of the optical detectors.

7. An integrated optical detector system as claimed in claim 1, further comprising an ancillary detector installed on the optical bench that receives an ancillary optical signal from the interferometer.

8. An integrated optical detector system as claimed in claim 1, wherein the ancillary detector is used to determine a spectral response of a sample.

9. An integrated optical detector system as claimed in claim 1, further comprising a thermoelectric cooler installed on the optical bench an configured to stabilize a temperature of at least one of the balanced detector system and the electronic amplifier system.

10. An integrated optical detector system for use with an optical coherence analysis system, the integrated optical detector system comprising:
an optical bench installed within a hermetic optoelectronic package, the optoelectronic package having two separate fiber feedthroughs positioned on opposing sides of the optoelectronic package and for receiving separate associated optical fibers therethrough, the separate associated optical fibers configured to transmit incoming optical signals from a sample arm and a reference arm of an interferometer of an optical coherence analysis system external to the optoelectronic package;
at least one beam splitter/combiner installed on the bench that generates interference signals from a sample optical signal from the sample arm and a reference optical signal from the reference arm;
a balanced detector system installed on the optical bench, the balanced detector system including at least two optical detectors that receive the interference signals from the at least one beam splitter/combiner;
an electronic amplifier system installed on the optical bench for amplifying an output of the at least two optical detectors; and
a thermoelectric cooler installed on the optical bench an configured to stabilize a temperatures of at least one of the at least one beam splitter/combiner, the balanced detector system, and the electronic amplifier system.

11. An integrated optical detector system as claimed in claim 10, wherein the balanced detector system comprises at least four of optical detectors, and the integrated optical detector system further comprises:
a first polarization beam splitter for dividing the interference signals into a first polarization and a second polarization;
a second polarization beam splitter for dividing the interference signals into a first polarization and a second polarization;
a first pair of the optical detectors that detect the interference signals of the first polarization; and
a second pair of the optical detectors that detect the interference signals of the second polarization.

12. An integrated optical detector system as claimed in claim 11, wherein the electronic amplifier system comprises a first electronic amplifier for amplifying the output of the first pair of the optical detectors and a second electronic amplifier for amplifying the output of the second pair of the optical detectors is also included in the package.

13. An integrated optical detector system as claimed in claim 10, further comprising at least one lead extending from the optoelectronic package and in electrical communication with the electronic amplifier system, the at least one lead configured to provide an amplified output to an analog to digital converter system of the optical coherence analysis system for sampling of the amplified output, and the at least one lead further configured to provide power input to the electronic amplifier system.

14. An optical coherence tomography system, comprising:
a hermetic optoelectronic package;
an optical bench installed within the optoelectronic package;
a swept source installed on the optical bench that generates a tunable optical signal;
an interferometer installed on the optical bench that transmits the tunable optical signal to a sample; and
an optical detector system, comprising:
first and second pairs of optical detectors installed on the optical bench;
at least two polarization beam splitters installed on the optical bench that transmit interference signals having a first polarization to the first pair of the optical detectors and transmitting the interference signals having a second polarization to the second pair of the optical detectors; and
an electronic amplifier system installed on the optical bench, the electronic amplifier system comprises a first electronic amplifier for amplifying the output of the first pair of the optical detectors and a second electronic amplifier for amplifying the output of the second pair of the optical detectors.

15. An optical coherence tomography system as claimed in claim 14, further comprising a thermoelectric cooler installed on the optical bench and configured to stabilize a temperature of at least one of the swept source, the interferometer, the first and second pairs of optical detectors, the two polarization beam splitters, and the electronic amplifier system.

16. An optical coherence tomography system, comprising:
a hermetic optoelectronic package;
an optical bench installed within the optoelectronic package;
a swept source installed on the optical bench that generates a tunable optical signal;
an interferometer installed on the optical bench that transmits the tunable optical signal to a sample;
an isolator installed on the optical bench that prevents back reflections from the interferometer from interfering with operation of the swept source; and
an optical detector system, comprising
a balanced detector system installed on the optical bench, the balanced detector system including at least two optical detectors that receive interference signals generated from the interferometer based, at least in part, on optical signals reflected from the sample; and
an electronic amplifier system installed on the optical bench for amplifying an output of the at least two optical detectors.

17. An optical coherence tomography system as claimed in claim 16, wherein the balanced detector system comprises at least four optical detectors, and the optical detector system comprises two polarization beam splitters installed on the optical bench that transmit the interference signals having a first polarization to a first pair of the optical detectors and transmitting the interference signals having a second polarization to a second pair of the optical detectors.

18. An optical coherence tomography system as claimed in claim 17, wherein the electronic amplifier system comprises a first electronic amplifier for amplifying the output of the first pair of the optical detectors and a second electronic amplifier for amplifying the output of the second pair of the optical detectors.

19. An optical coherence tomography system as claimed in claim 16, further comprising an ancillary detector installed on the optical bench that receives an ancillary optical signal.

20. An optical coherence tomography system as claimed in claim 19, wherein the ancillary detector is used to determine a spectral response of the sample.

21. An optical coherence tomography system as claimed in claim 16, further comprising:
   at least one beam splitter/combiner installed on the optical bench that generates the interference signals from a sample optical signal from a sample arm and a reference optical signal from a reference arm of the interferometer.

22. An optical coherence tomography system as claimed in claim 16, further comprising a thermoelectric cooler installed within the optoelectronic package for stabilizing a temperature of the balanced detector system and the electronic amplifier system.

23. An optical coherence tomography system as claimed in claim 16, further comprising at least one lead extending from the optoelectronic package and in electrical communication with the electronic amplifier system, the at least one lead configured to provide the amplified output to an analog to digital converter system of the optical coherence analysis system for sampling of the amplified output, and the at least one lead further configured to provide power input to the electronic amplifier system.

* * * * *